(12) United States Patent
Mishima et al.

(10) Patent No.: US 12,026,228 B2
(45) Date of Patent: Jul. 2, 2024

(54) LEARNING METHOD, STORAGE MEDIUM, AND IMAGE PROCESSING DEVICE

(71) Applicant: KABUSHIKI KAISHA TOSHIBA, Tokyo (JP)

(72) Inventors: Nao Mishima, Inagi (JP); Masako Kashiwagi, Ageo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 515 days.

(21) Appl. No.: 17/467,720

(22) Filed: Sep. 7, 2021

(65) Prior Publication Data
US 2022/0188571 A1 Jun. 16, 2022

(30) Foreign Application Priority Data
Dec. 15, 2020 (JP) .................................. 2020-207634

(51) Int. Cl.
*G06N 20/00* (2019.01)
*G06F 18/214* (2023.01)
(Continued)

(52) U.S. Cl.
CPC .......... *G06F 18/2148* (2023.01); *G06F 18/22* (2023.01); *G06N 20/00* (2019.01); *H04N 23/695* (2023.01)

(58) Field of Classification Search
CPC ...... G06F 18/2148; G06F 18/22; G06F 17/18; G06N 20/00; G06N 3/045; G06N 3/084;
(Continued)

(56) References Cited

U.S. PATENT DOCUMENTS

| 11,030,760 B2 * | 6/2021 | Kashiwagi | ............. G06T 7/571 |
| 11,100,662 B2 * | 8/2021 | Mishima | ................. G06T 7/571 |

(Continued)

FOREIGN PATENT DOCUMENTS

| JP | 2020-026990 A | 2/2020 |
| JP | 2020-148483 A | 9/2020 |

(Continued)

OTHER PUBLICATIONS

Burges, C. et al., "Learning to Rank Using Gradient Descent", Proceedings of the 22nd International Conference on Machine Learning, 2005, 8 pages, DOI: 10.1145/1102351.1102363.
(Continued)

*Primary Examiner* — Sheela C Chawan
(74) *Attorney, Agent, or Firm* — Oblon, McClelland, Maier & Neustadt, L.L.P.

(57) ABSTRACT

According to one embodiment, a learning method includes acquiring first and second images and causing a statistical model to learn based on a first distance output from the statistical model by inputting a first region of the first image, and a second distance output from the statistical model by inputting a second region of the second image. A relationship in size between a third distance to a subject in the first image and a fourth distance to the subject included in the second image is already known. The causing includes causing the statistical model to learn such that a relationship in size between the first and the second distances is equal to a relationship in size between the third and the fourth distances.

15 Claims, 8 Drawing Sheets

(51) Int. Cl.
  *G06F 18/22*  (2023.01)
  *H04N 23/695*  (2023.01)
(58) Field of Classification Search
  CPC .. H04N 23/695; H04N 25/61; G06V 10/7747; G06V 10/82
  USPC .................................................. 382/100, 155
  See application file for complete search history.

(56) References Cited

U.S. PATENT DOCUMENTS

| | | | |
|---|---|---|---|
| 2014/0009634 A1* | 1/2014 | Hiwada | H04N 23/843 348/222.1 |
| 2020/0051264 A1 | 2/2020 | Mishima et al. | |
| 2020/0294260 A1 | 9/2020 | Kashiwagi et al. | |
| 2021/0082146 A1 | 3/2021 | Kashiwagi et al. | |
| 2021/0312233 A1 | 10/2021 | Mishima et al. | |
| 2021/0319537 A1* | 10/2021 | Hiasa | G06T 5/73 |
| 2022/0270222 A1* | 8/2022 | Kashiwagi | G06T 5/20 |
| 2023/0032387 A1* | 2/2023 | Mishima | G06V 10/774 |

FOREIGN PATENT DOCUMENTS

| | | |
|---|---|---|
| JP | 2021-043115 A | 3/2021 |
| JP | 2021-165944 A | 10/2021 |

OTHER PUBLICATIONS

Kashiwagi, M. et al., "Deep Depth From Aberration Map", 2019 IEEE/CVF International Conference on Computer Vision (ICCV), 2019, 10 pages, DOI: 10.1109/ICCV.2019.00417.

Mishima, N. et al., "Physical Cue based Depth-Sensing by Color Coding with Deaberration Network", BMVC, 2019, 13 pages, https://bmvc2019.org/wp-content/uploads/papers/0156-paper.pdf.

Imai, Takuji, "Toshiba's Stereo-like Distance Image from Monocular Camera Aberrations—Shape Estimation from Lens Chromatic Aberration and Other Factors Using Deep Learning", NIKKEI Robotics, Mar. 2020, (with unedited computer-generated English translation), 16 pages.

\* cited by examiner

$f_\theta(x_i) < f_\theta(x_k)$ is met if rank(i)<rank(k)

Learn with loss which urges the above relationship to be maintained

LEARNING METHOD, STORAGE MEDIUM, AND IMAGE PROCESSING DEVICE

CROSS-REFERENCE TO RELATED APPLICATIONS

This application is based upon and claims the benefit of priority from Japanese Patent Application No. 2020-207634, filed Dec. 15, 2020, the entire contents of which are incorporated herein by reference.

FIELD

Embodiments described herein relate generally to a learning method, a storage medium, and an image processing device.

BACKGROUND

Use of images captured by two imaging devices (cameras) or a stereoscopic camera (compound-eye camera) to acquire a distance to a subject is known, but in recent years a technique of acquiring a distance to a subject by using images captured by one imaging device (monocular camera) has been developed.

Use of a statistical model generated by applying machine learning algorithms such as a neural network to acquire the distance to a subject by using images as mentioned above has been conceived.

However, it is necessary to make the statistical model learn enormous data sets for learning (sets of learning images and correct answer values on the distance to the subject in the learning images) to generate a high accuracy statistical model, but preparation for the data sets is not easy.

DETAILED DESCRIPTION

In general, according to one embodiment, a learning method of causing a statistical model for inputting an image including a subject and outputting a distance to the subject to learn is provided. The learning method includes acquiring first and second images each including the subject captured by a capture device and causing the statistical model to learn based on a first distance output from the statistical model by inputting a first region that is at least a part of the first image, and a second distance output from the statistical model by inputting a second region that is at least a part of the second image. A relationship in size between a third distance to the subject included in the first image and a fourth distance to the subject included in the second image is already known. The causing includes causing the statistical model to learn such that a relationship in size between the first distance and the second distance is equal to a relationship in size between the third distance and the fourth distance.

Various embodiments will be described hereinafter with reference to the accompanying drawings.

First Embodiment

Figure 1:
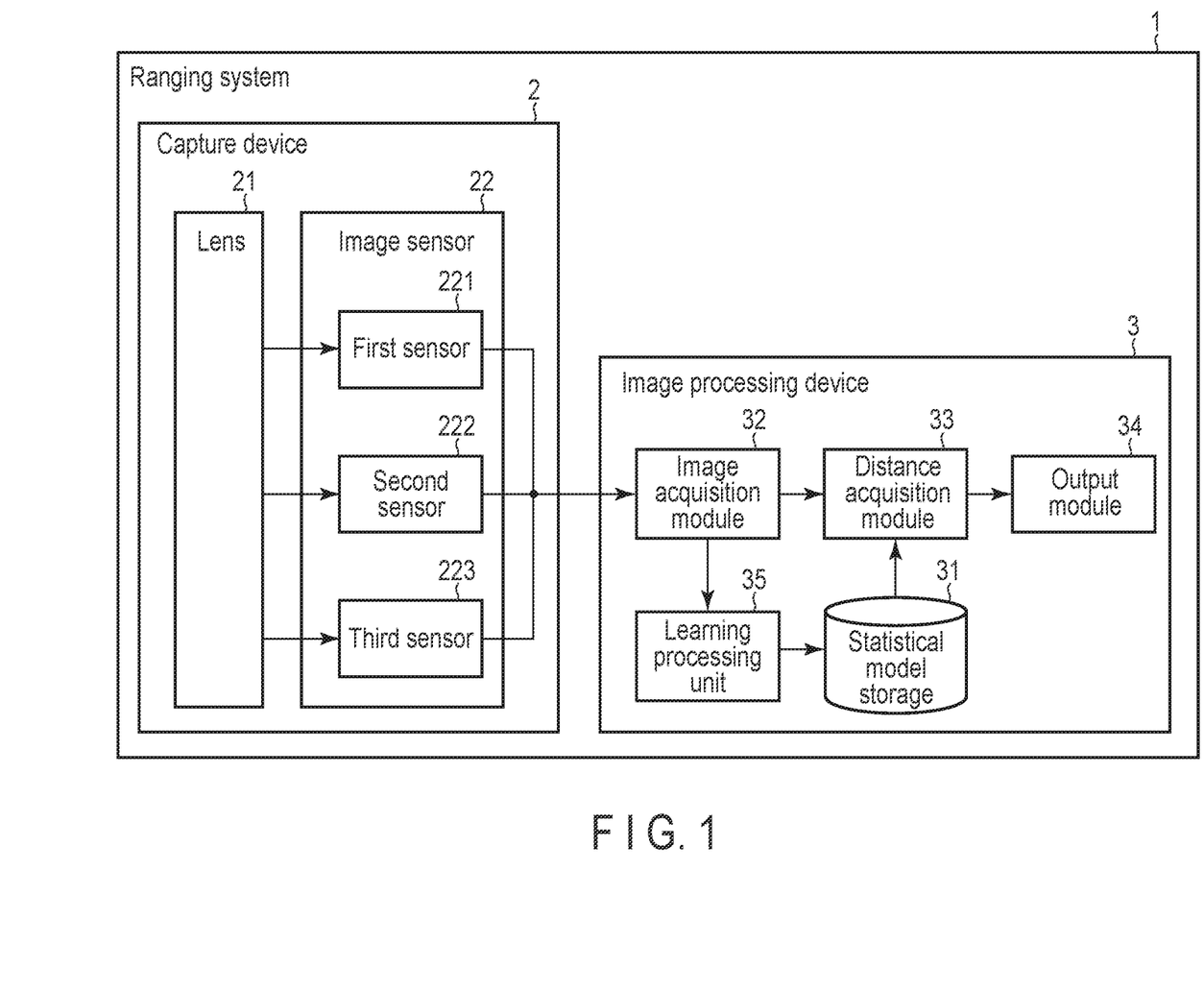
FIG. 1 is a diagram showing an example of a configuration of a ranging system according to a first embodiment.

First, a first embodiment will be described. FIG. 1 shows an example of a configuration of a ranging system according to the present embodiment. The ranging system 1 shown in FIG. 1 is used to capture an image and obtain (measure) the distance from the capture point to a subject using the captured image. The distance described in the embodiment may be an absolute distance or a relative distance.

As shown in FIG. 1, a ranging system 1 includes a capture device 2 and an image processing device 3. In the present embodiment, the ranging system 1 is assumed to include the capture device 2 and the image processing device 3 as separate devices, but the ranging system 1 may be realized as a single device (ranging device) in which the capture device 2 functions as a capture unit and the image processing device 3 functions as an image processing unit. In addition, the image processing device 3 may operate as, for example, a server which executes various types of cloud computing services.

The capture device 2 is used to capture various types of images. The capture device 2 includes a lens 21 and an image sensor 22. The lens 21 and the image sensor 22 are equivalent to an optical system (monocular camera) of the capture device 2.

Light reflected on a subject is made incident on the lens 21. The light incident on the lens 21 is transmitted through the lens 21. The light transmitted through the lens 21 reaches the image sensor 22 and is received (detected) by the image sensor 22. The image sensor 22 generates an image composed of a plurality of pixels by converting the received light into electric signals (photoelectric conversion).

The image sensor 22 is implemented by, for example, a charge coupled device (CCD) image sensor, a complementary metal oxide semiconductor (CMOS) image sensor and the like. The image sensor 22 includes, for example, a first sensor (R sensor) 221 that detects light of a red (R) wavelength band, a second sensor (G sensor) 222 that detects light of a green (G) wavelength band, and a third sensor (B sensor) 223 that detects light of a blue (B) wavelength band. The image sensor 22 can receive the light of the wavelength bands corresponding to the first to third sensors 221 to 223, and generate sensor images (R image, G image, and B image) corresponding to the respective wavelength bands (color components). That is, the image captured by the capture device 2 is a color image (RGB image) and includes an R image, a G image and a B image.

In the present embodiment, the image sensor 22 is assumed to incorporate the first to third sensors 221 to 223, but the image sensor 22 may be configured to include at least one of the first to third sensors 221 to 223. In addition, the image sensor 22 may be configured to incorporate, for example, a sensor for generating a monochrome image instead of the first to third sensors 221 to 223.

In the present embodiment, an image generated based on the light which has passed through the lens 21 is an image affected by the aberration of the optical system (lens 21), and includes bokeh which occurs due to the aberration.

The image processing device 3 shown in FIG. 1 includes, as functional constituent elements, statistical model storage 31, an image acquisition module 32, a distance acquisition module 33, an output module 34, and a learning processing module 35.

In the statistical model storage 31, a statistical model used to obtain the distance to the subject from an image captured by the capture device 2 is stored. The statistical model stored in the statistical model storage 31 is generated by learning the bokeh which occurs in the image affected by the above-described aberration of the optical system and which changes nonlinearly according to the distance to the subject in the image. According to the statistical model, the distance to the subject in the image can be predicted (output) as a predictive value corresponding to the image by inputting the image to the statistical model.

It is assumed that the statistical model can be generated by applying, for example, various types of known machine learning algorithms such as neural networks, linear discriminators, and random forests. In addition, the neural networks applicable to the present embodiment may include, for example, a convolutional neural network (CNN), a fully connected neural network, a recursive neural network, and the like.

The image acquisition module 32 acquires the image captured by the capture device 2 from the capture device 2 (image sensor 22).

The distance acquisition module 33 uses the image obtained by the image acquisition module 32 to acquire distance information indicating the distance to the subject in this image. In this case, the distance acquisition module 33 inputs the image to the statistical model stored in the statistical model storage 31 to acquire the distance information indicating the distance to the subject in this image.

The output module 34 outputs the distance information acquired by the distance acquisition module 33 in, for example, a map format in which the distance information is positionally arranged in association with the image. In this case, the output module 34 can output image data consisting of pixels in which the distance indicated by the distance information is a pixel value (i.e., output the distance information as image data). When the distance information is thus output as the image data, the image data can be displayed as, for example, a distance image indicating the distance by colors. The distance information output by the output module 34 can also be used to calculate, for example, a size of a subject in the image captured by the capture device 2.

The learning processing module 35 executes, for example, a process of causing the statistical model stored in the statistical model storage 31 to learn, using the image acquired by the image acquisition module 32. The details of the process executed by the learning processing module 35 will be described later.

In the example shown in FIG. 1, the image processing device 3 incorporates the modules 31 to 35, but the image processing device 3 may be composed of, for example, a ranging device incorporating the image acquisition module 32, the distance acquisition module 33, and the output module 34, and a learning device incorporating the statistical model storage 31, the image acquisition module 32, and the learning processing module 35.

Figure 2:
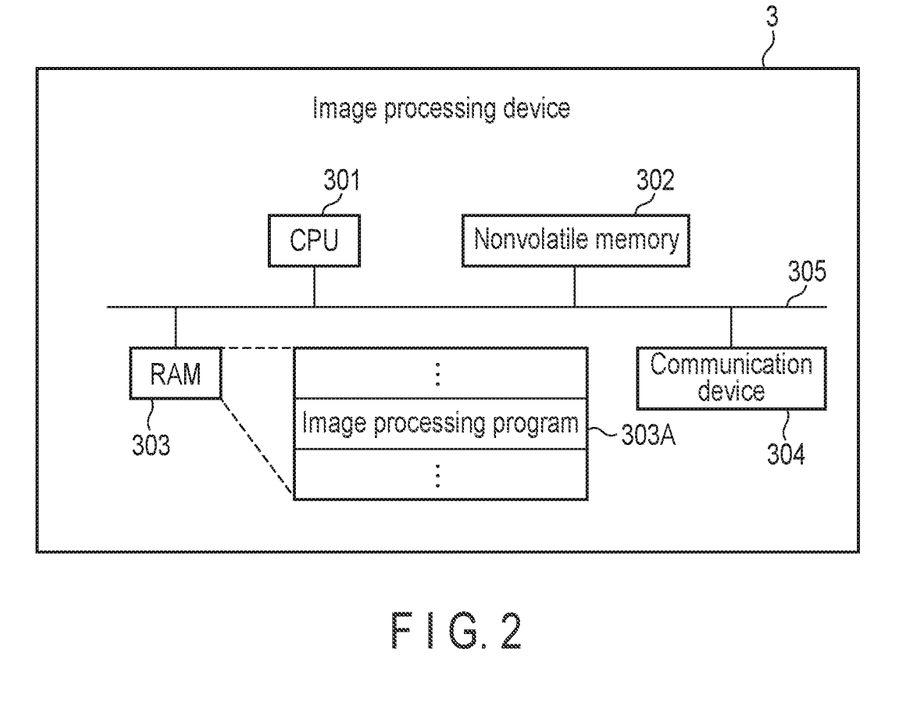
FIG. 2 is a diagram showing an example of a system configuration of an image processing device.

FIG. 2 shows an example of the system configuration of the image processing device 3 shown in FIG. 1. The image processing device 3 includes a CPU 301, a nonvolatile memory 302, a RAM 303 and a communication device 304. In addition, the image processing device 3 includes a bus 305 that mutually connects the CPU 301, the nonvolatile memory 302, the RAM 303 and the communication device 304 with one another.

The CPU 301 is a processor for controlling the operations of various components in the image processing device 3. The CPU 301 may be a single processor or may be composed of a plurality of processors. The CPU 301 executes various programs loaded from the nonvolatile memory 302 into the RAM 303. These programs include an operating system (OS) and various application programs. The application programs include an image processing program 303A.

The nonvolatile memory 302 is a storage medium used as an auxiliary storage device. The RAM 303 is a storage medium used as a main storage device. The nonvolatile memory 302 and the RAM 303 alone are shown in FIG. 2, but the image processing device 3 may include, for example, the other storage device such as a hard disk drive (HDD) or a solid storage drive (SSD).

In the present embodiment, the statistical model storage 31 shown in FIG. 1 is realized by, for example, the nonvolatile memory 302 or the other storage device.

In addition, in the present embodiment, the image acquisition module 32, the distance acquisition module 33, the output module 34 and the learning processing module 35 shown in FIG. 1 are assumed to be partially or entirely realized by causing the CPU 301 (i.e., the computer of the image processing device 3) to execute the image processing program 303A, in other words, by software. The image processing program 303A may be stored in a computer-readable storage medium and distributed, or may be downloaded into the image processing device 3 through a network.

It has been described that the CPU 301 is caused to execute the image processing program 303A, but some or all of the modules 32 to 35 may be realized by using, for example, a GPU (not shown) instead of the CPU 301. In addition, some or all of the modules 32 to 35 may be realized by hardware such as an integrated circuit (IC) or realized a combination of software and hardware.

The communication device 304 is a device configured to execute wired communication or wireless communication. The communication device 304 includes a transmitting unit which transmits signals and a receiving unit which receives signals. The communication device 304 communicates with an external device via a network and communicates with an external device which is present around the communication device 304. This external device includes the capture device 2. In this case, the image processing device 3 can receive an image from the capture device 2 via the communication device 304.

Although omitted in FIG. 2, the image processing device 3 may further include, for example, an input device such as a mouse or keyboard, and a display device such as a display.

Figure 3:
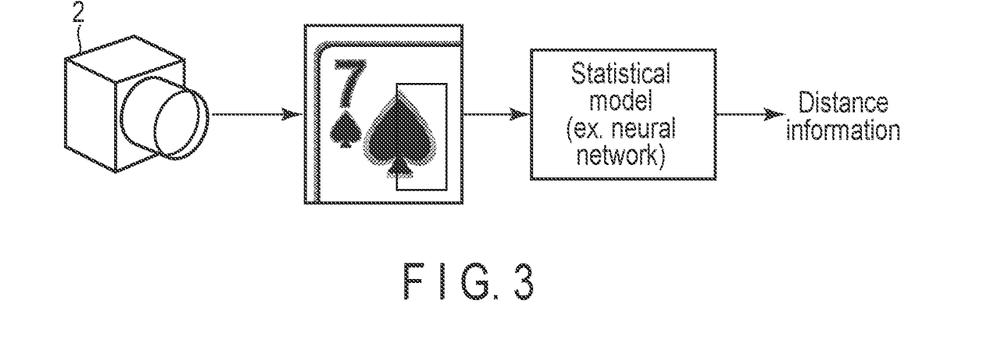
FIG. 3 is a diagram illustrating a summary of operations of a ranging system.

Next, an outline of the operations of the ranging system 1 of the present embodiment will be described with reference to FIG. 3.

In the ranging system 1, the capture device 2 (image sensor 22) generates an image affected by the aberration of the optical system (lens 21) as described above.

The image processing device 3 (image acquisition module 32) acquires the image generated by the capture device 2 and inputs the image to the statistical model stored in the statistical model storage 31.

According to the statistical model of the present embodiment, the distance (predictive value) to the subject in the image input as described above is output. Accordingly, the image processing device 3 (distance acquisition module 33) can acquire the distance information indicating the distance output from the statistical model (distance to the subject in the image).

Thus, in the present embodiment, the distance information can be acquired from the image captured by the capture device 2 using the statistical model.

A principle for predicting the distance to the subject in the present embodiment will be explained in brief with reference to FIG. 4.

Bokeh resulting from the aberration (lens aberration) of the optical system of the capture device 2 occurs as stated above, in an image captured by the capture device 2 (hereinafter referred to as a captured image). More specifically, since the refractive index of light when transmitted through the lens 21 having aberration differs depending on the wavelength band, light of wavelength bands is not concentrated at one point but reaches different points when, for example, the position of the subject is out of the focus position (position in focus in the capture device 2). This appears as bokeh (chromatic aberration) on the image.

In addition, in the captured image, bokeh (color, size and shape) changing nonlinearly in accordance with the distance to the subject in the image (i.e., the position of the subject with respect to the capture device 2) is observed.

Figure 4:
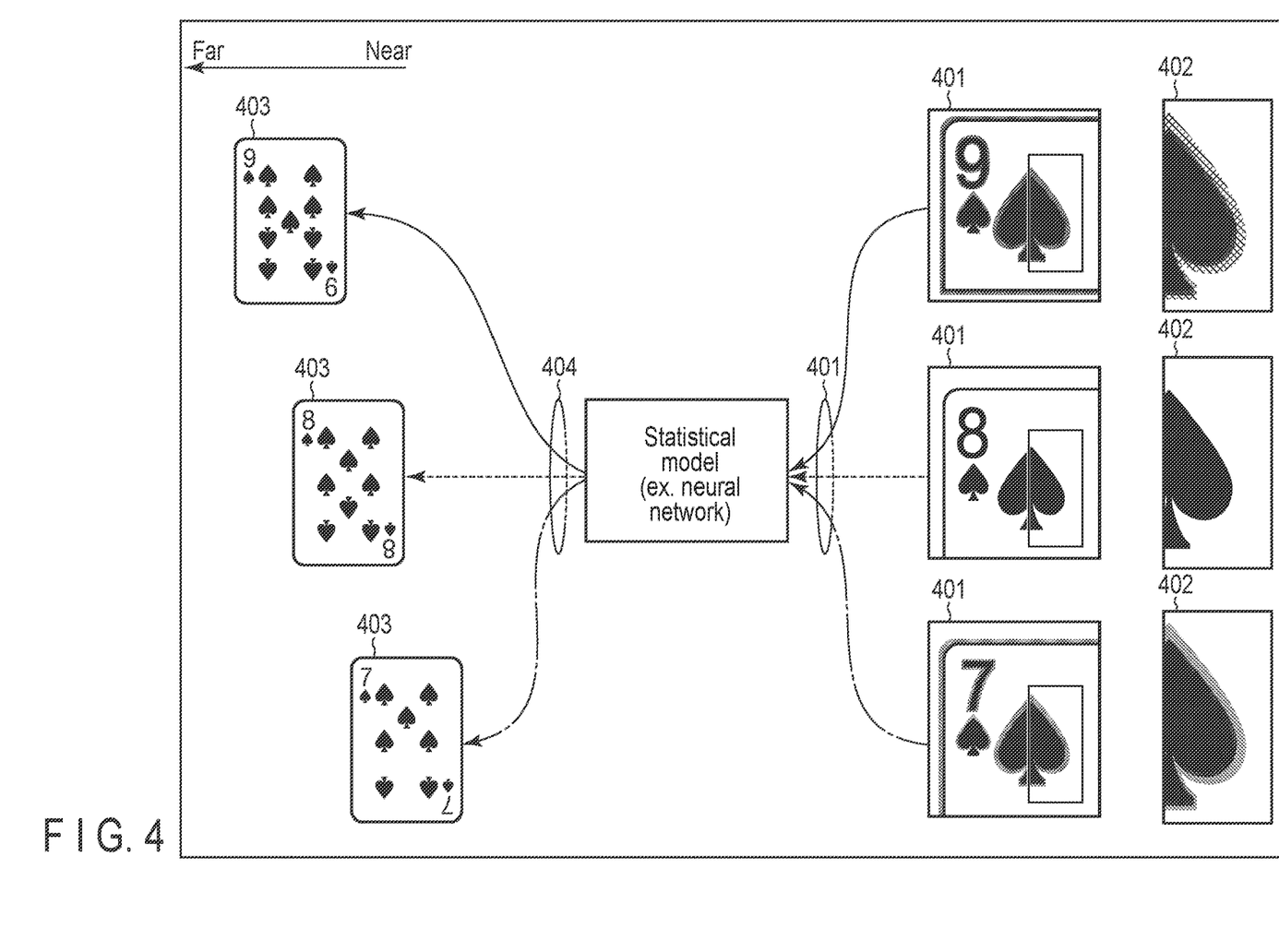
FIG. 4 is a diagram illustrating a principle of predicting the distance to a subject.

For this reason, in the present embodiment, as shown in FIG. 4, bokeh (bokeh information) 402 occurring in a captured image 401 is analyzed as a physical clue related to the distance to a subject 403 in a statistical model, and a distance 404 to the subject 403 is thereby predicted.

An example of a method for predicting the distance from the captured image in the statistical model will be described with reference to FIG. 5. A patch method will be explained here.

Figure 5:
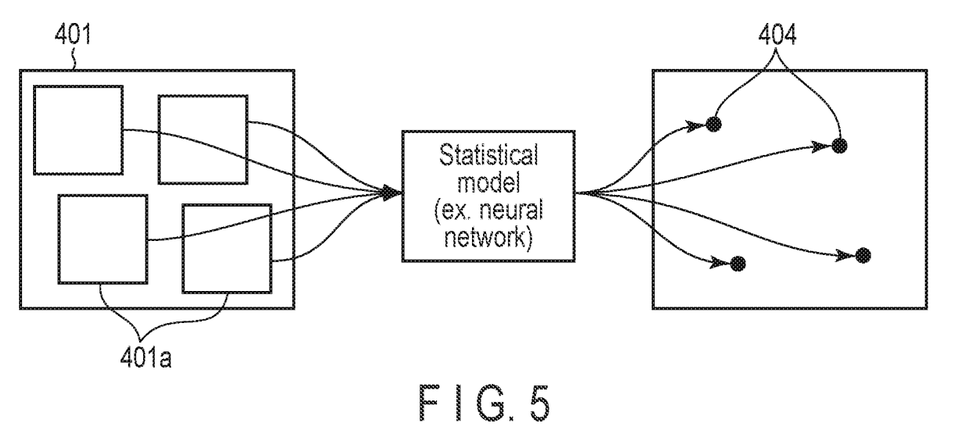
FIG. 5 is a diagram illustrating a patch method of predicting the distance from a captured image.

As shown in FIG. 5, local regions (hereinafter referred to as image patches) 401*a* are cut out (extracted) from the captured image 401 in the patch method.

In this case, for example, the entire region of the captured image 401 may be divided in a matrix and the divided partial regions may be cut out in series as the image patches 401*a* or the captured image 401 may be recognized and the image patches 401*a* may be cut out to cover the region where the subject (image) is detected. The image patches 401*a* may be partially overlaid on the other image patches 401*a*.

In the patch method, the distance is output as the predicted value corresponding to the image patch 401*a* cut out as described above. That is, in the patch method, information on each of the image patches 401*a* cut out from the captured image 401 is input, and the distance 404 to the subject included in each of the image patches 401*a* is predicted.

Figure 6:
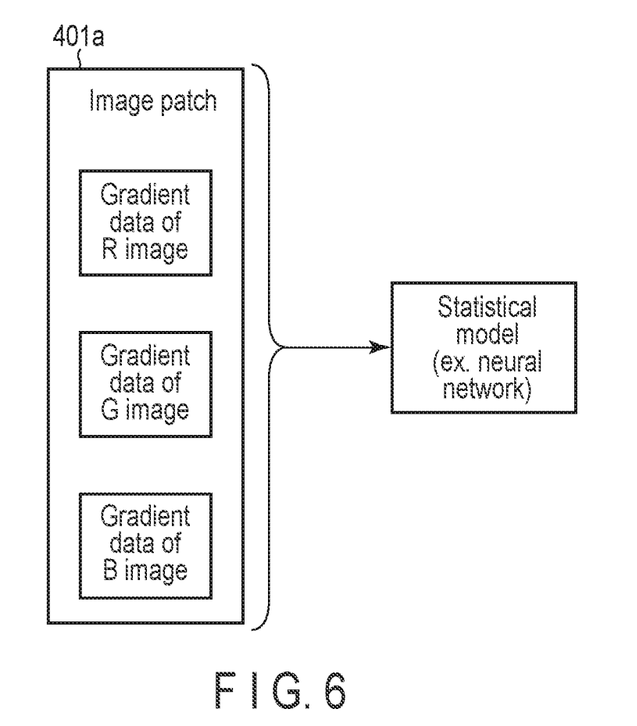
FIG. 6 is a diagram showing an example of the information on an image patch.

FIG. 6 shows an example of the information on the image patch 401*a* input to the statistical model in the above-described patch method.

In the patch method, the gradient data (gradient data of the R image, gradient data of the G image, and the gradient data of the B image) of the image patch 401*a* cut out from the captured image 401 is generated with respect to each of the R image, G image and B image included in the captured image 401. The gradient data thus generated is input to the statistical model.

The gradient data is equivalent to the difference (difference value) of the pixel value between each pixel and a pixel adjacent to this pixel. For example, when the image patch 401*a* is extracted as a rectangular region of n pixels (X-axis direction)×m pixels (Y-axis direction), the gradient data (i.e., gradient data of each pixel) in which, for example, the difference values from adjacent right pixels as calculated with respect to the respective pixels included in the image patch 401*a* are arranged in a matrix of n rows×m columns is generated.

The statistical model predicts the distance from the bokeh occurring in each of the images, using the gradient data of the R image, the gradient data of the G image, and the gradient data of the B image. In FIG. 6, the gradient data of each of the R image, the G image, and the B image is input to the statistical model, but the gradient data of an RGB image may be input to the statistical model.

In the present embodiment, (the distance information indicating) the distance to the subject included in the image can be acquired from the image by using the statistical model as described above, and the statistical model needs to be caused to learn in order to improve the accuracy of the distance output from the statistical model.

Figure 7:
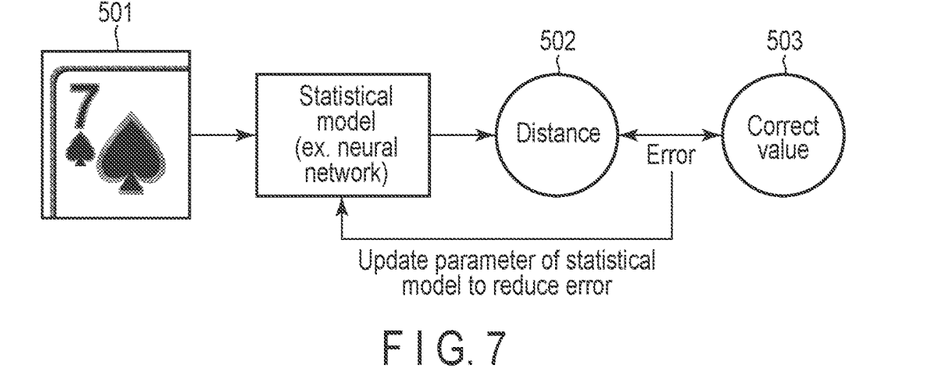
FIG. 7 is a diagram illustrating an outline of a learning method of a general statistical model.

An outline of a general method of causing the statistical model to learn will be described below with reference to FIG. 7. Causing the statistical model to learn is executed by inputting the information on an image prepared for the learning (hereinafter referred to as an image for learning) 501 to the statistical model and feeding back an error (loss) between a distance 502 output (predicted) from the statistical model and a correct value 503 to the statistical model. The correct level 503 is indicative of a real distance (measured value) from a capture point of the image for learning 501 to a subject included in the image for learning 501 and is also referred to as, for example, a correct answer label or the like. In addition, feedback is indicative of updating a parameter (for example, a weight coefficient) of the statistical model to reduce the error.

More specifically, when the above-described patch method is applied as a method of predicting the distance from the captured image in the statistical model, information (gradient data) on the image patch is input to the statistical model, for each image patch (local region) cut out from the image for learning 501, and the distance 502 is output as the predicted value corresponding to each image patch by the statistical model. An error obtained by comparing the distance 502 thus output with the correct value 503 is fed back to the statistical model.

Figure 8:
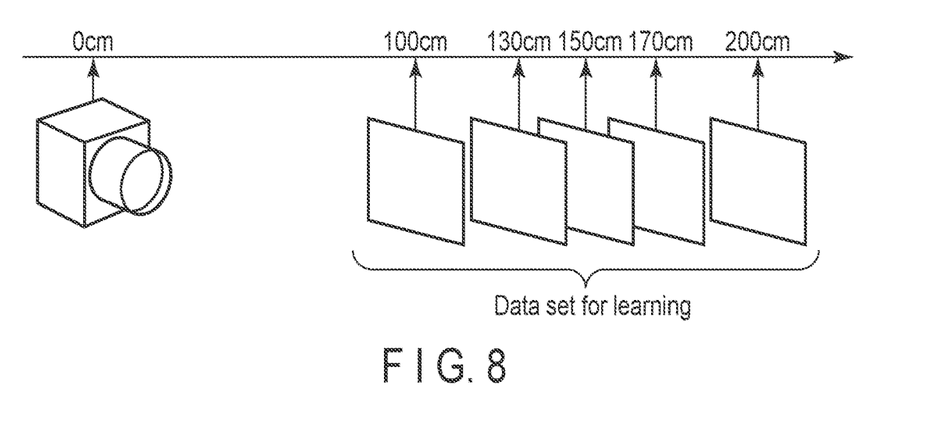
FIG. 8 is a diagram illustrating a data set for learning.

In the above-described general method of causing the statistical model to learn, the image for learning assigned a correct answer label shown in FIG. 8 (i.e., a data set for learning including the image for learning and the correct answer label which is the distance to be acquired from the image for learning) needs to be prepared, and the real distance to the subject included in the image for learning must be measured every time the image for learning is captured. Since it is necessary to cause the statistical model to learn a large number of data sets for learning to improve the accuracy of the statistical model, preparing such a large number of data sets for learning is not easy.

The loss (error) calculated based on the distance that is output from the statistical model by inputting the image for learning (image patch) needs to be evaluated (fed back) to cause the statistical model to learn, the measured value of the distance to the subject included in the image for learning is unclear in the present embodiment, but weak supervised learning is assumed to be executed by rank loss calculated using a plurality of images for learning in which the relationship in size of the distances is already known.

The weak supervised learning based on the rank loss is a method of learning based on the relative order relationship (rank) between data. In the present embodiment, the statistical model is assumed to be caused to learn based on the rank of each of two images based on the distance from the capture device 2 to the subject.

Figure 9:
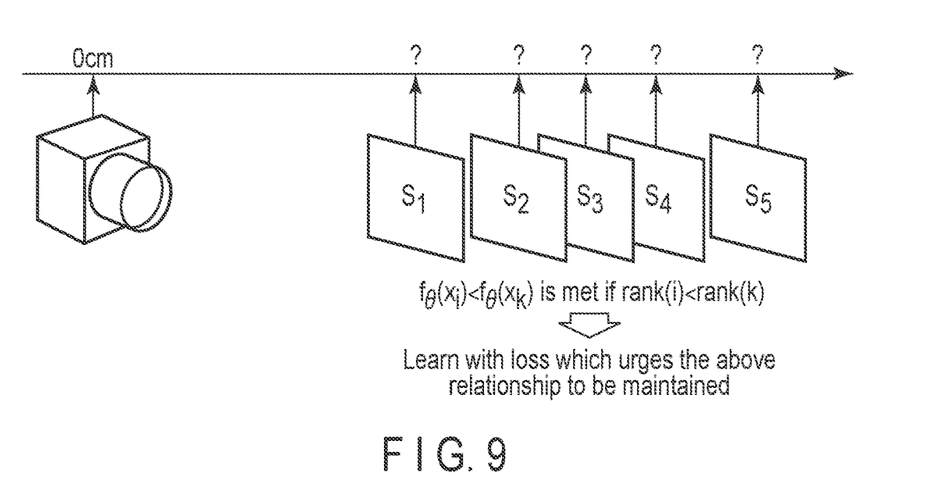
FIG. 9 is a diagram illustrating an outline of a learning method of the statistical model according to the embodiments.

As shown in FIG. 9, the real distance from the capture device 2 is unclear, but five subjects $S_1$ to $S_5$ where the relationship (rank) in size of the distances are already known are assumed to be present. The subject $S_1$ of the subjects $S_1$ to $S_5$ is located at a position closest to the capture device 2, and the subject $S_5$ is located at a position farthest from the capture device 2. When each of the subjects $S_1$ to $S_5$ is captured by the capture device 2 and images including the respective subjects $S_1$ to $S_5$ are referred to as images $x_1$ to $x_5$, the rank of each of the images corresponding to the distances to the subjects $S_1$ to $S_5$ included in the respective images $x_1$ to $x_5$ is "1" for the image $x_1$, "2" for the image $x_2$, "3" for the image $x_3$, "4" for the image $x_4$, and "5" for the image $x_5$.

In such images $x_1$ to $x_5$, it is assumed that, for example, the distance to the subject $S_2$ included in the image $x_2$ and the distance to the subject $S_5$ included in the image $x_5$ are predicted using the statistical model.

In this case, if learning is sufficiently executed and a high accuracy statistical model is used, the distance that is output from the statistical model by inputting the image $x_2$ should be smaller than the distance that is output from the statistical model by inputting the image $x_5$.

That is, in the present embodiment, for example, when the relationship in size between two images $x_i$ and $x_k$ is already known, the statistical model is assumed to be caused to learn using a loss (rank loss) which allows the relationship to be maintained, based on a premise that the relationship "$f_\theta(x_i) > f_\theta(x_k)$ if rank $(x_i)$ > rank $(x_k)$" is satisfied.

In this case, the rank $(x_i)$ is indicative of the rank assigned to the image $x_i$ and the rank $(x_k)$ is indicative of the rank referred to the image $x_k$. In addition, $f_\theta(x_i)$ is indicative of a distance (i.e., a predicted value corresponding to the image $x_i$) that is output from the statistical model $f_\theta$ by inputting the image $x_i$, and $f_\theta(x_k)$ is indicative of a distance (i.e., a predicted value corresponding to the image $x_k$) that is output from the statistical model $f_\theta$ by inputting the image $x_k$. In addition, $\theta$ of $f_\theta$ is a parameter of the statistical model.

Figure 10:
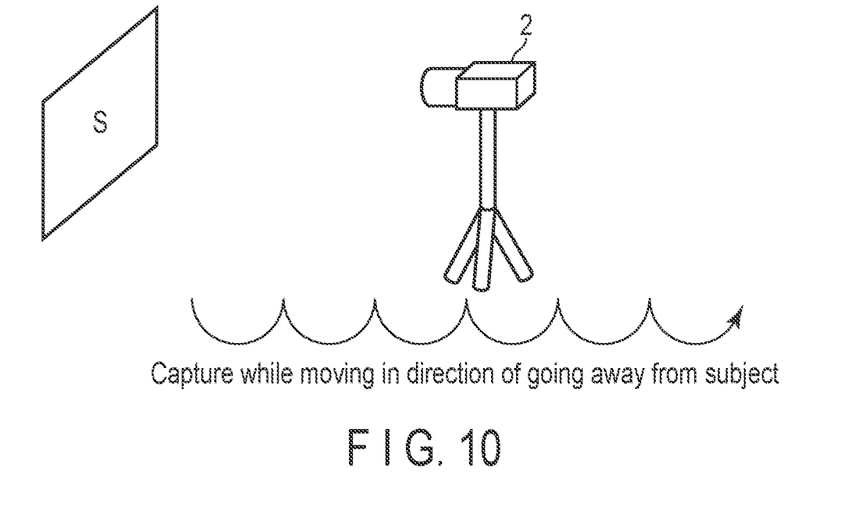
FIG. 10 is a diagram illustrating a learning image which the statistical model learns.

The images in which the above relationship in size of the distance from the capture device 2 to the subject is already known can easily be acquired by, for example, sequentially capturing while moving the capture device 2 in a direction of going away from the subject S fixed at a predetermined position as shown in FIG. 10.

In general, since images captured by the capture device 2 are assigned identification numbers (for example, serial numbers) in order of being captured, the identification numbers assigned to the images are used as the ranks of the images, in the present embodiment. That is, it can be discriminated that the distance to the subject included in the image assigned the identification number is small (close) when the identification number is small, and that the distance to the subject included in the image assigned the identification number is large (far) when the identification number is large.

The image captured by the capture device 2 is assigned the date and time when the image was captured other than the above-described identification number. For this reason, when the images are sequentially captured while moving the capture device 2 in the direction of going away from the subject as described above, the relationship in size of the distance to the subject included in each of the images (i.e., the front-back relationship in rank of the image) can also be determined based on the date and time assigned to the image.

It has been described that the images are captured while moving the capture device 2 in the direction of going away from the subject, but images may be captured sequentially while moving the capture device 2 in the direction of approaching the subject. In this case, it can be discriminated that the distance to the subject included in the image assigned the identification number is large (far) when the identification number is small, and that the distance to the subject included in the image assigned the identification number is small (close) when the identification number is large.

The subject having a planar shape is shown in FIG. 10 but, for example, a television monitor or the like can be used as the subject. The subject having a planar shape has been described, but the subject may be the other object having the other shape, or the like.

Figure 11:
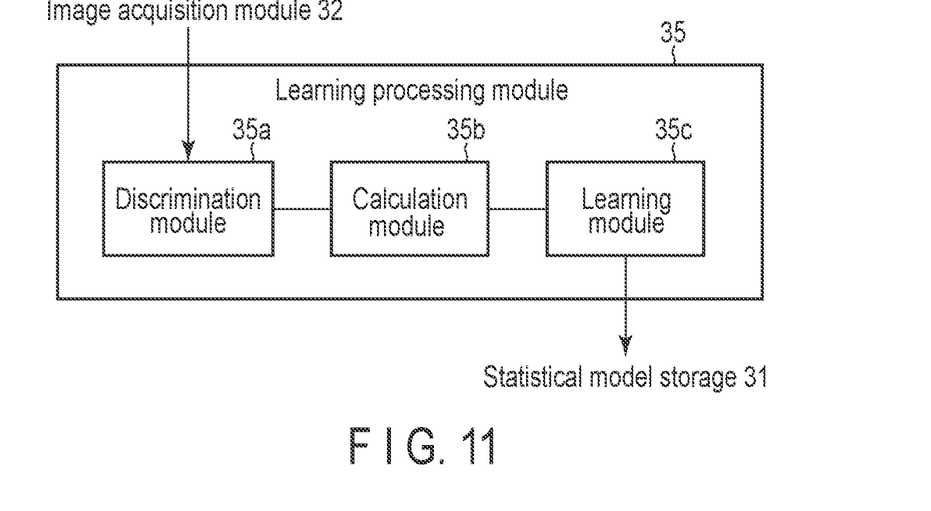
FIG. 11 is a block diagram showing an example of the function configuration of a learn processing module.

The learning processing module 35 included in the image processing device 3 shown in FIG. 1 will be described below more specifically. FIG. 11 is block diagram showing an example of the functional configuration of the learning processing module 35.

As shown in FIG. 11, the learning processing module 35 includes a discrimination module 35a, a calculation module 35b and a learning module 35c.

When executing the learning of the statistical model in the present embodiment, the image acquisition module 32 acquires a plurality of images for learning that are not assigned the above-described correct answer labels. It is assumed that the images for learning are assigned the above-described identification numbers.

The discrimination module 35a discriminates the relationship in size between the distances to the subjects included in the respective images for learning (hereinafter simply referred to as a relationship in size between images), based on the identification numbers (ranks) assigned respectively to two images for learning, of a plurality of images for learning acquired by the image acquisition module 32.

The calculation module 35b calculates the rank loss, based on the distance output by inputting to the statistical model each of two images for learning for which the relationship in size is discriminated by the discrimination module 35a, and the relationship in size between the images for learning that is discriminated by the discrimination module 35a.

The learning module 35c cause the statistical model stored in the statistical model storage 31 to learn based on the rank loss calculated by the calculation module 35b. The statistical model that completes learning is stored in the statistical model storage 31 (i.e., overwritten to the statistical model stored in the statistical model storage 31).

Next, an example of a processing procedure of the image processing device 3 at the time of causing the statistical model to learn will be described with reference to a flowchart of FIG. 12.

It is assumed that the statistical model which has been preliminarily trained (preliminarily trained model) is stored in the statistical model storage 31 but, for example, the statistical model may be generated by learning the image captured with the capture device 2 or may be generated by learning an image captured with a capture device (or a lens) different from the capture device 2. That is, in the present embodiment, the statistical model for outputting the distance to the subject included in the image by using at least the image as the input may be prepared in advance. The statistical model prepared in advance in the present embodiment may be, for example, a statistical model in a randomly initialized state (untrained statistical model) or the like.

First, the image acquisition module 32 acquires a plurality of images for learning (hereinafter referred to as a set of images for learning) (step S1). The set of images for learning acquired in step S1 is, for example, a set of the images captured by the capture device 2.

When the process of step S1 is executed, the learning processing module 35 selects (acquires), for example, two arbitrary images for learning, from the set of images for learning acquired in step S1 (step S2). In the following descriptions, two images for learning selected in step S2 are referred to as an image $x_i$ and an image $x_k$.

When the process of step S2 is executed, the learning processing module 35 cuts out an arbitrary region from each of the image $x_i$ and the image $x_k$ (step S3). More specifically, the learning processing module 35 cuts a region that is at least a part of the image $x_i$, from the image $x_i$. Similarly, the learning processing module 35 cuts a region that is at least a part of the image $x_k$, from the image $x_k$. The region which is cut from each of the image $x_i$ and the image $x_k$ in step S3 corresponds to the above-described image patch and is, for example, a rectangular region of n pixels×m pixels.

It has been described that a predetermined region (image patch) is cut from each of the image $x_i$ and the image $x_k$, but the predetermined region may be a region occupying entire bodies of the image $x_i$ and the image $x_k$.

In the following description, the region which is cut from the image $x_i$ in step S3 is simply referred to as the image $x_i$, and the region which is cut from the image $x_k$ in step S3 is simply referred to as the image $x_k$, for convenience.

Since the relationship in size of the distance to the subject included in the image for learning is already known in the present embodiment, the distinction module 35a included in the learning processing module 35 discriminates the relationship in size between the image $x_i$ and the image $x_k$ selected in step S2 (relationship in size between the distances to the subjects included respectively in the image $x_i$ and the image $x_k$) (step S4). The relationship in size between the image $x_i$ and the image $x_k$ can be discriminated based on the identification number assigned to each of the image $x_i$ and the image $x_k$.

When the process of step S4 is executed, the calculation module 35b included in the learning processing module 35 acquires the distance (predicted value) to the subject included in the image $x_i$ and the distance (predicted value) to the subject included in the image $x_k$ by using the statistical model stored in the statistical model storage 31 (step S5).

In step S5, the distance $f_\theta(x_i)$ that is output from the statistical model by inputting the image $x_i$ (i.e., the image patch of n pixels×m pixels cut from the image $x_i$), and the distance $f_\theta(x_k)$ that is output from the statistical model by inputting the image $x_k$ (i.e., the image patch of n pixels×m pixels cut from the image $x_k$) are acquired.

Next, the calculation module 35b calculates a rank loss (loss in consideration of the relationship in size between the image $x_i$ and the image $x_k$), based on the distance acquired in step S5 (hereinafter referred to as a predicted value corresponding to each of the image $x_i$ and the image $x_k$) (step S6).

In step S6, a loss (rank loss) on which whether the relationship in size between the predicted values corresponding to the respective image $x_i$ and the image $x_k$ is equal to the relationship in size between the image $x_i$ and the image $x_k$ or not is reflected.

For example, according to "Chris Burges, Tal Shaked, Erin Renshaw, Ari Lazier, Matt Deeds, Nicole Hamilton, and Greg Hullender, Learning to rank using gradient descent, In Proceedings of the 22nd international conference on Machine learning, pages 89-96, 2005.", a function (rank loss function) indicative of the rank loss is defined by the following expression (1).

$$L_{rank}(x_i, x_k) = \\ -y_{ik}(f_\theta(x_k) - f_\theta(x_i)) + \mathrm{softplus}(f_\theta(x_k) - f_\theta(x_i))$$ Expression (1)

$$y_{ik} = \begin{cases} 1 & \text{if } \mathrm{rank}(x_k) > \mathrm{rank}(x_i) \\ 0 & \text{if } \mathrm{rank}(x_k) < \mathrm{rank}(x_i) \end{cases}$$ Expression (2)

$$\mathrm{softplus}(x) = \log(1 + e^x)$$ Expression (3)

In this expression (1), $L_{rank}(x_i, x_k)$ refers to a rank loss, and $y_{ik}$ corresponds to a label indicative of whether the above-described relationship in size between the predicted values corresponding respectively to the image $x_i$ and the image $x_k$ is equal to the relationship in size between the image $x_i$ and the image $x_k$ (i.e., whether the predicted values of the statistical model satisfy the known relationship in size) or not. In this case, $y_{ik}$ is 1 when rank($x_i$)>rank($x_k$) or 0 when rank($x_i$)<rank($x_k$), as indicated by expression (2). In addition, rank($x_i$)>rank($x_k$) and rank($x_i$)<rank($x_k$) correspond to discrimination results of the relationship in size between the image $x_i$ and the image $x_k$ in step S4.

Furthermore, softplus of expression (1) is a function referred to as a softplus used as an activation function, and is defined as expression (3).

According to such a rank loss function, (the value of) of the calculated rank loss becomes smaller when the relationship in size between the predicted values corresponding respectively to the image $x_i$ and the image $x_k$ is equal to the relationship in size between the image $x_i$ and the image $x_k$, and (the value of) of the calculated rank loss becomes larger when the relationship in size between the predicted values corresponding respectively to the image $x_i$ and the image $x_k$ is not equal to the relationship in size between the image $x_i$ and the image $x_k$.

Next, the learning module 35c included in the learning processing module 35 causes the statistical model to learn, using the rank loss calculated in step S6 (step S7). The learning of the statistical model is executed by updating parameter θ of the statistical model, but updating the parameter θ is executed according to an optimization problem such as the following expression (4).

$$\theta' = \arg\min_\theta \sum_{x_i, x_k \in N} L_{rank}(x_i, x_k)$$ Expression (4)

In expression (4), N refers to the above-described set of images for learning. The processes of steps S2 to S6 are assumed to be executed for each group of (regions cut from each of) arbitrary images $x_i$ and the images $x_k$ selected from N sets of images for learning, although omitted in FIG. 12.

In this case, a parameter θ' (i.e., an updated parameter) by which the total of rank loss $L_{rank}(x_i, x_k)$ calculated for each group of images $x_i$ and the images $x_k$ becomes smallest can be obtained, by expression (4).

When a neural network, a convolutional neural network or the like is applied to the statistical model in the present embodiment (i.e., the statistical model is composed of a neural network, a convolutional neural network, or the like), an error back propagation method of calculating the above-described expression (4) in a reverse direction is used for learning of the neural network (updating of the parameter θ). According to this error back propagation method, the gradient of the rank loss is calculated, and the parameter θ is updated according to the gradient.

In step S7, the statistical model can be caused to learn the set of images for learning acquired in step S1, by updating the parameter θ of the statistical model to the parameter θ' obtained by using the above expression (4).

Figure 12:
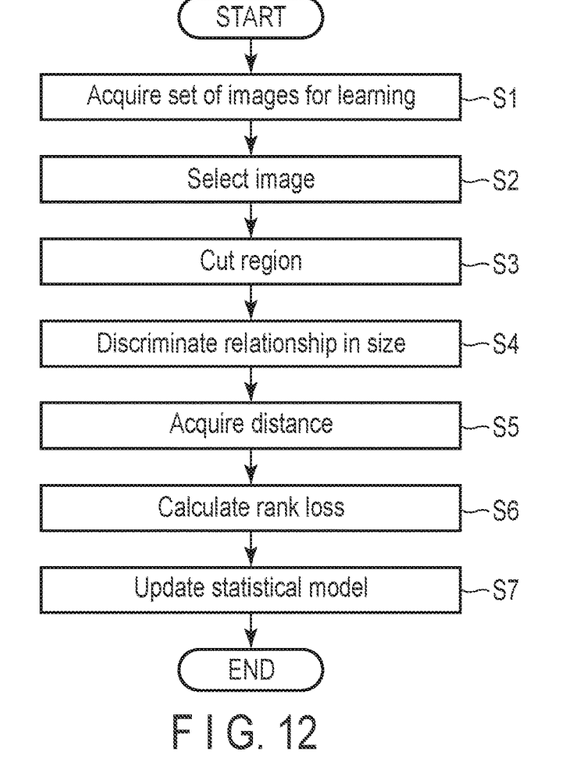
FIG. 12 is a flowchart showing an example of a procedure of the image processing device at the time of causing a statistical model to learn.

In the present embodiment, for example, the process shown in FIG. 12 is executed for a predetermined number of groups of images $x_i$ and the images $x_k$, but the statistical model may be caused to further learn by repeating the process shown in FIG. 12.

In addition, the learning method using the rank loss function as represented by the above expression (1) is referred to as RankNet, but the statistical model may be caused to learn by other learn methods in the present embodiment. More specifically, for example, FRank, RankBoost, Ranking SVM, IR SVM, or the like may be used as the learning method of the statistical model according to the present embodiment. That is, in the present embodiment, if the statistical model is caused to learn such that the relationship in size between the predicted values corresponding respectively to the image $x_i$ and the image $x_k$ is equal to the relationship in size between the image $x_i$ and the image $x_k$ (i.e., if learning is executed under the constraint on each rank of the image for learning), various loss functions can be used.

Figure 13:
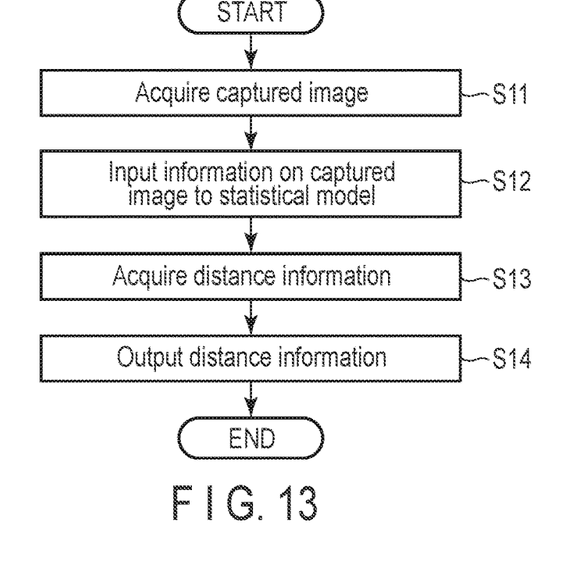
FIG. 13 is a flowchart showing an example of a procedure of the image processing device at the time of acquiring distance information from a captured image.

Next, an example of the procedure of the image processing module 3 at the time of acquiring the distance information from the captured images using the statistical model that has been caused to learn the set of images for learning by executing the above-described process shown in FIG. 11, will be described with reference to a flowchart of FIG. 13.

First, the capture device 2 (image sensor 22) generates the capture image including the subject by capturing the subject whose distance from the capture device 2 is to be measured. This captured image is an image that is affected by the aberration of the optical system (lens 21) of the capture device 2 as described above.

The image acquisition module 32 included in the image processing device 3 acquires a capture image from the capture device 2 (step S11).

Next, the distance acquisition module 33 inputs the information on the captured image (each of the image patch) acquired in step S11 to the statistical model stored in the statistical model storage 31 (step S12). The information on the captured image input to the statistical model in step S12 includes the gradient data of each pixel that constitutes the captured image.

When the process of step S12 is executed, the distance to the subject is predicted in the statistical model, and the statistical model outputs the predicted distance. The distance acquisition module 33 thereby acquires the distance information indicating the distance output from the statistical model (step S13). The distance information acquired in step S13 includes, for example, the distance for each image patch constructing the captured image acquired in step S11.

When the process of step S13 is executed, the output module 34 outputs the distance information acquired in step S13 in, for example, the map format in which the information is arranged positionally in association with the captured image (step S14). In the present embodiment, the distance information is output in the map format, but the distance information may be output in the other formats.

In the present embodiment, as described above, the image $x_i$ and the image $x_k$ (first image and second image) including the subject captured by the capture device 2 are acquired, and the statistical model is caused to learn based on the distance (first distance) output from the statistical model by inputting the image $x_i$ (first region that is at least a part of the image $x_i$) and the distance (second distance) output from the statistical model by inputting the image $x_k$ (second region that is at least a part of the image $x_k$). In the present embodiment, the relationship in size between the distance (third distance) to the subject included in the image $x_i$ and the distance (fourth distance) to the subject included in the image $x_k$ (i.e., the relationship in size between the image $x_i$ and the image $x_k$) is already known, and the statistical model is caused to learn such that the relationship in size between the predicted value (first distance) corresponding to the image $x_i$ and the predicted value (second distance) corresponding to the image $x_k$ is equal to the front-back relationship between the image $x_i$ and the image $x_k$.

In the present embodiment, this configuration allows the statistical model to learn even on the images for learning that are not assigned correct answer labels (instruction labels), thus improving the easiness of learning in the statistical models.

In addition, in the present embodiment, it is assumed that, for example, a plurality of images for learning including the image $x_i$ and the image $x_k$ are captured while moving the capture device 2 in the direction of going away from the subject fixed to a predetermined position. According to this, the relationship in size between the distances to the subjects included in the images for learning can easily be discriminated based on the identification numbers (for example, serial numbers) assigned to the respective images for learning in accordance with the order of being captured.

For example, the plurality of images for learning including the image $x_i$ and the image $x_k$ may be captured while moving the capture device 2 in the direction of approaching the subject.

In addition, in the present embodiment, the relationship in size between the distances to the subjects included in the respective images for learning is discriminated based on the identification numbers assigned to the images for learning, but the relationship in size may be discriminated based on the position of the capture device 2 at the time of capturing the images for learning in a case where the position of the subject is fixed as described. Such a position of the capture device 2 may be assigned to the images for learning.

For example, an internal field sensor (gyro sensor, acceleration sensor, or the like) may be built in the capture device 2, and the movement (trajectory) of the capture device 2 can be calculated according to the signals detected by the internal field sensor. In this case, the position of the capture device 2 at the time of capturing the above-described images for learning can be acquired based on movement of capture device 2 calculated by a signal provided by the inner world sensor.

Alternatively, for example, when an image for learning is captured using a stage including a movement mechanism for moving the capture device 2, the position of the capture device 2 at the time of capturing the image for learning may be acquired based on the position of the stage.

In addition, for example, a TV monitor or the like having a flat shape can be used as the subject included in the image for learning in the present embodiment. When the TV monitor is used as the subject, various images can be switched and displayed on the TV monitor, and (images for learning of) various color patterns can be learned by the statistical model.

Furthermore, in the present embodiment, two arbitrary images for learning are selected from the set of images for learning (i.e., the images for learning are selected randomly) at the time of causing the statistical model to learn, but, for example, images for learning where the difference in distance to the subject is larger than or equal to a predetermined value may be selected preferentially as the two images for learning. The distance (measured value) to the subject in each image for learning is unknown but, since the order in which each of the images for learning is captured (i.e., the relationship in size of the distance to the subject) is already known by the identification number, images where the difference in distance to the subject is estimated to be larger than or equal to a predetermined value can be selected by selecting, for example, two images for learning where the difference between the identification numbers assigned to the images for learning is larger than or equal to a predetermined value. According to this, misrecognition (confusion) of the relationship in size between the images for learning can be eliminated.

In addition, when an image for learning is captured, a situation may arise that images are captured continually depending on the operation of the capture device 2 even though the subject does not move. For this reason, two images for learning where the difference in the time (date and time) at which they were captured is larger than or equal to a predetermined value may be selected preferentially.

Alternatively, when causing the statistical model to learn, an arbitrary region is cut out from each of two images for learning selected from the set of images for learning (i.e., a region is cut out randomly), and this region may be cut out based on a predetermined regularity, for example, according to the position, pixel value, and the like in each image for learning.

In the present embodiment, the patch method is described as an example of the method of predicting the distance from the image in the statistical model, but, for example, a screen batch method in which the whole region of the screen is input to the statistical model and a predicted value (distance) corresponding to the whole region is output, or the like may be adopted as the method of predicting the distance from the image.

In the present embodiment, it has been described that the statistical model is generated by learning the image for learning affected by the aberration of the optical system (bokeh that changes nonlinearly depending on the distance to the subject included in the image for learning), but the statistical model may be generated by, for example, learning an image for learning generated based on the light transmitted through a filter (color filter or the like) provided in the opening portion of the capture device 2 (i.e., bokeh that changes nonlinearly depending on the distance to the subject, which is intentionally generated in the image by the filter).

Second Embodiment

Next, a second embodiment will be described. Since the configuration and the like of the ranging system (capture device and image processing device) in the present embodiment are the same as those in the above-described first embodiment, FIG. 1 and the like will be used appropriately when the configuration of the ranging system is described in the present embodiment. Points different from the above-described first embodiment will be mainly described.

In the above-described first embodiment, the statistical model outputs the distance to the subject included in the image, but the statistical model in the present embodiment outputs the degree of uncertainty (hereinafter referred to as the degree of uncertainty) for the distance (i.e., the predicted value) together with the distance. The present embodiment is different from the above-described first embodiment in that the statistical model is caused to learn using the rank loss (rank loss function) that reflects the degree of uncertainty output from the statistical model in this manner. The degree of uncertainty is represented by, for example, a real number larger than or equal to zero, and is assumed to indicate that the uncertainty is higher as the value is larger. The method of calculating the degree of uncertainty is not limited to a specific method, and various known methods can be applied.

Figure 14:
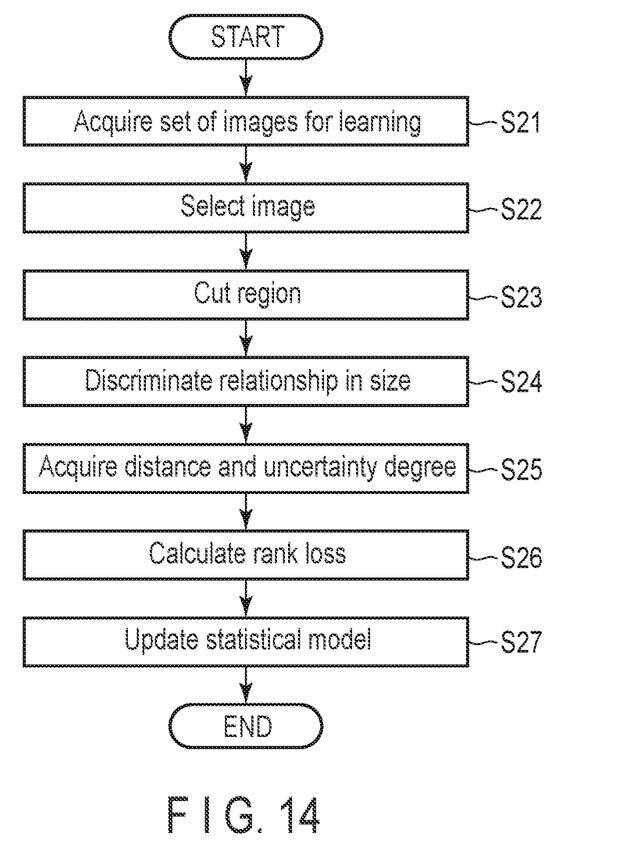
FIG. 14 is a flowchart showing an example of a procedure of the image processing device at the time of causing a statistical model to learn in a second embodiment.

An example of a procedure of the image processing device 3 at the time of causing a statistical model to learn in the present embodiment will be described with reference to a flowchart of FIG. 14.

First, processes of steps S21 to S24 corresponding to the above-described processes of steps S1 to S4 shown in FIG. 12 are executed.

When the process of step S24 is executed, the calculation module 35b included in the learning processing module 35 acquires, using the statistical model stored in the statistical model storage 31, the distance to the subject included in the image $x_i$ and the degree of uncertainty for the distance (predicted value and degree of uncertainty corresponding to the image $x_i$), and the distance to the subject included in the image $x_k$ and the degree of uncertainty for the distance (predicted value and degree of uncertainty corresponding to the image $x_k$) (step S25).

When the above degree of uncertainty is represented by σ, the distance $f_θ(x_i)$ and degree of uncertainty $σ_i$ output from the statistical model $f_θ$ by inputting the image $x_i$ (i.e., the image patch of n pixels×m pixels cut out from the image $x_i$) to the statistical model, and the distance $f_θ(x_k)$ and degree of uncertainty $σ_k$ output from the statistical model $f_θ$ by inputting the image $x_k$ (i.e., the image patch of n pixels×m pixels cut output from the image $x_k$) are acquired in step S5.

Next, the calculation module 35b calculates the rank loss based on the distance and the degree of uncertainty acquired in step S25 (step S26).

In the above-described first embodiment, the rank loss is calculated using the expression (1), and a function representing the rank loss in the present embodiment (rank loss function) is defined below in expression (5).

$$L_{uncrt}(x_i, x_k) = \frac{1}{\sigma} L_{rank}(x_i, x_k) + \log\sigma \quad \text{Expression (5)}$$

$$\sigma = \max(\sigma_i, \sigma_k) \quad \text{Expression (6)}$$

In the expression (5), $L_{uncrt}(x_i, x_k)$ represents the rank loss calculated in the present embodiment, and $L_{rank}(x_i, x_k)$ is the same as $L_{rank}(x_i, x_k)$ in expression (1) of the above first embodiment.

For example, if a region where no texture is present or a region saturated with light (i.e., blown out) is cut out in step S23, it is difficult to output a highly accurate distance from the statistical model (i.e., to predict the correct distance) but, in the above-described first embodiment, learning is executed to satisfy the relationship in size between the image $x_i$ and the image $x_k$ even in a region where there are no or few clues to predict such a distance (hereinafter referred to as "difficult-to-predict region"), and overlearning may occur. In this case, the statistical model is optimized for the difficult-to-predict region, and the versatility of the statistical model is reduced.

Therefore, in the present embodiment, the rank loss in consideration of difficult-to-predict property (unpredictability) in the above difficult-to-predict region is calculated by adding the degree of uncertainty σ to the loss function as shown above in expression (5). In expression (5), σ refers to the uncertainty having a larger value of the uncertainty $\sigma_i$ and the uncertainty $\sigma_k$ as defined in expression (6).

According to the rank loss function (uncertainty rank loss function) as shown in expression (5), if $L_{rank}(x_i, x_k)$ cannot be lowered (made smaller) in the difficult-to-predict region, the rank loss in the present embodiment, $L_{uncrt}(x_i, x_k)$, can be adjusted to be lowered by increasing at least one of the uncertainty $\sigma_i$ and the uncertainty $\sigma_k$ (i.e., uncertainty σ). To prevent $L_{uncrt}(x_i, x_k)$ from being lowered too much by increasing the uncertainty σ excessively, however, the second term is added to the right side of expression (5) as a penalty.

The rank loss function shown in expression (5) can be obtained by, for example, extending the defining expression of heteroscedasticity.

When the process in step S26 is executed, a process in step S27 corresponding to the above-described process in step S7 shown in FIG. 12 is executed. In step S27, the statistical model may be caused to learn by using $L_{rank}(x_i, x_k)$ of expression (4) described in the above first embodiment as $L_{uncrt}(x_i, x_k)$.

As described above, in the present embodiment, when causing the statistical model to learn so as to minimize the rank loss calculated based on the predicted values (first distance and second distance) corresponding to the image $x_i$ and the image $x_k$, the rank loss is adjusted based on at least one of the uncertainties (first and second uncertainties) corresponding to the image $x_i$ and the image $x_k$ output from the statistical model.

In the present embodiment, this configuration allows the impact of the above-mentioned difficult-to-predict region on the learning of the statistical model to be mitigated, thus enabling learning of a highly accurate statistical model to be realized.

Third Embodiment

Next, a third embodiment will be described. Since the configuration and the like of the ranging system (capture device and image processing device) in the present embodiment are the same as those in the above-described first embodiment, FIG. 1 and the like will be used appropriately when the configuration of the ranging system is described in the present embodiment. Points different from the above-described first embodiment will be mainly described.

The present embodiment is different from the above-described first embodiment in that the statistical model is caused to learn such that the relationship in size between two images for learning is satisfied and that the variation of the distances (predicted values) corresponding to two different regions in the same image for learning is minimized. In the present embodiment, it is assumed that a TV monitor or the like having a flat shape is used as the subject included in the image for learning.

An example of a procedure of the image processing device 3 at the time of causing the statistical model to learn in the present embodiment will be described below. For convenience, a flowchart of FIG. 12 will be used here.

First, the processes of steps S1 and S2 described in the above first embodiment are executed. In the following descriptions, two images for learning selected in step S2 are referred to as an image $x_i$ and an image $x_k$.

When the process of step S2 is executed, the learning processing module 35 cuts out an arbitrary region from each of the image $x_i$ and the image $x_k$ (step S3).

In the above-described first embodiment, one region is cut out from each of the image $x_i$ and the image $x_k$ but, in the present embodiment, for example, two regions are cut out from the image $x_i$ and one region is cut out from the image $x_k$.

In the above-described first embodiment, the region occupying the entire image $x_i$ and image $x_k$ may be cut out but, in the present embodiment, several regions (image patches) of the image $x_i$ and the image $x_k$ are cut out.

In the following descriptions, two regions cut out from the image $x_i$ in step S3 are simply referred to as an image $x_{i1}$ and an image $x_{i2}$, and the region cut out from the image $x_k$ in step S3 is simply referred to as the image $x_k$, for convenience.

When the process of step S3 is executed, the processes of steps S4 and S5 described in the above first embodiment above are executed. In step S5, the distance $f_\theta(x_{i1})$ output from the statistical model $f_\theta$ by inputting the image $x_{i1}$, the distance $f_\theta(x_{i2})$ output from the statistical model $f_\theta$ by inputting the image $x_{i2}$, and the distance $f_\theta(x_k)$ output from the statistical model $f_\theta$ by inputting the image $x_k$ are acquired.

Next, the calculation module 35b calculates the rank loss based on the distances (predicted values corresponding respectively to the images $x_{i1}$, $x_{i2}$, and $x_k$) acquired in step S5 (step S6).

Since the subject included in the image for learning in the present embodiment has a flat shape, the distance to the subject in the same image for learning is the same. In the present embodiment, this point is focused, and the statistical model is caused to learn such that the variation of the predictive values corresponding to the images $x_{i1}$ and $x_{i2}$ (i.e., two regions cut out from the same image $x_i$) is minimized.

In this case, the function (rank loss function) representing the rank loss in the present embodiment is defined below as shown in expression (7).

$$L_{intra}(x_{i1}, x_k, x_{i2}) = L_{rank}(x_{i1}, x_k) + \lambda |f_\theta(x_{i1}) - f_\theta(x_{i2})| \quad \text{Expression (7)}$$

$$\text{rank}(x_{i1}) \neq \text{rank}(x_k), \text{rank}(x_{i1}) = \text{rank}(x_{i2}) \quad \text{Expression (8)}$$

In the expression (7), $L_{intra}(x_{i1}, x_{i2}, x_k)$ represents the rank loss calculated in the present embodiment, and $L_{rank}(x_i, x_k)$ corresponds $L_{rank}(x_i, x_k)$ in the expression (1) of the above-described first embodiment. In other words, $L_{rank}(x_i, x_k)$ is calculated using image $x_i$ in the expression (1) as image $x_{i1}$.

In addition, the second term on the right side of expression (7) represents the variation (difference) between the distance (predicted value) corresponding to the image $x_{i1}$ and the distance (predicted value) corresponding to the image $x_{i2}$, and λ in the second term is an arbitrary coefficient (λ>0) to balance the first term on the right side.

In the present embodiment, since the image $x_{i1}$ and the image $x_{i2}$ are regions cut out from the same image $x_i$, the relationship in size among the image $x_{i1}$, the image $x_{i2}$, and the image $x_k$ (i.e., front-back relationship of the rank of each of the image $x_{i1}$, the image $x_{i2}$, and the image $x_k$) satisfies expression (8).

When the process of step S6 is executed, the process of step S7 described in the above first embodiment is executed. In step S7, the statistical model may be caused to learn by using $L_{rank}(x_i, x_k)$ of expression (4) described in the above first embodiment as $L_{intra}(x_{i1}, x_{i2}, x_k)$.

As described above, in the present embodiment, the statistical model is caused to learn such that the differences in the distances (first and fifth distances) output from the statistical model are minimized using each of the two regions (first and third regions) cut out from the image $x_i$ as input, and more accurate learning of the statistical model can be implemented as compared with the above-described first embodiment, by considering the variation of the distances corresponding to the respective regions in the same image for learning.

In the present embodiment, the rank loss is calculated by considering the variation of the distance corresponding to each region in the image $x_i$ of the image $x_i$ and the image $x_k$, but a rank loss function that calculates the rank loss by further considering the variation of the distance corresponding to each region in the image $x_k$ may be used similarly to, for example, following expression (9).

$$L_{intra}(x_{i1},x_{k1},x_{i2},x_{k2})=L_{rank}(x_{i1},x_{k1})+\lambda|f_\theta(x_{i1})-f_\theta(x_{i2})|+ \lambda|f_\theta(x_{k1})-f_\theta(x_{k2})| \quad \text{Expression (9)}$$

In expression (9), two regions cut out from the image $x_k$ are represented as the image $x_{k1}$ and the image $x_{k2}$, respectively.

Alternatively, the present embodiment may be combined with the above-described second embodiment. In this case, a rank loss function such as the following expression (10) can be used.

$$L_{intra}(x_{i1}, x_k, x_{i2}) = \frac{1}{\sigma} L_{rank}(x_{i1}, x_k) + \log\sigma + \lambda|f_\theta(x_{i1}) - f_\theta(x_{i2})| \quad \text{Expression (10)}$$

According to at least one of the above-described embodiments, a learning method, a storage medium, and an image processing device capable of improving the easiness of learning in the statistical model can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A learning method of causing a statistical model for inputting an image including a subject and outputting a distance to the subject to learn, the learning method comprising:
   acquiring first and second images each including the subject captured by a capture device; and
   causing the statistical model to learn based on a first distance output from the statistical model by inputting a first region that is at least a part of the first image, and a second distance output from the statistical model by inputting a second region that is at least a part of the second image, wherein
   a relationship in size between a third distance to the subject included in the first image and a fourth distance to the subject included in the second image is already known,
   the causing includes causing the statistical model to learn such that a relationship in size between the first distance and the second distance is equal to a relationship in size between the third distance and the fourth distance.

2. The learning method of claim 1, wherein
   the statistical model outputs the first distance and a first degree of uncertainty of the first distance by inputting the first region, and outputs the second distance and a second degree of uncertainty of the second distance by inputting the second region,
   the causing includes causing the statistical model to learn such that a rank loss calculated based on the first distance and the second distance output from the statistical model is minimized, and
   the rank loss is adjusted based on at least one of the first degree of uncertainty and the second degree of uncertainty.

3. The learning method of claim 1, wherein
   the statistical model inputs a third region that is at least a part of the first image and that is different from the first region and outputs a fifth distance, and
   the causing includes causing the statistical model to learn such that a difference between the first distance and the fifth distance is minimized.

4. The learning method of claim 1, wherein
   the first image and the second image are captured by the capture device while moving the capture device in a direction of going away from the subject,
   identification numbers indicating orders of being captured by the capture device are assigned to the first image and the second image, and
   a relationship in size between the third distance and the fourth distance is discriminated based on the identification numbers assigned to the first image and the second image.

5. The learning method of claim 1, wherein
   the first image and the second image are captured by the capture device while moving the capture device in a direction of approaching the subject,
   identification numbers indicating orders of being captured by the capture device are assigned to the first image and the second image, and
   a relationship in size between the third distance and the fourth distance is discriminated based on the identification numbers assigned to the first image and the second image.

6. The learning method of claim 1, wherein
   a relationship in size between the third distance and the fourth distance is discriminated based on a position of the capture device at a time of capturing the first image and the second image by the capture device.

7. The learning method of claim 6, wherein the position of the capture device at the time of capturing the first image and the second image by the capture device is acquired by a sensor built in the capture device.

8. The learning method of claim 6, wherein the position of the capture device at the time of capturing the first image and the second image by the capture device is acquired based on a movement mechanism which moves the capture device.

9. The learning method of claim 1, wherein a shape of the subject is a planar shape.

10. The learning method of claim 1, wherein a difference between the third distance and the fourth distance is larger than or equal to a predetermined value.

11. The learning method of claim 1, wherein a difference between a first time at which the first image is captured and a second time at which the second image is captured is larger than or equal to a predetermined value.

12. The learning method of claim 1, wherein the statistical model is generated by learning bokeh which is generated in an image affected by aberration of an optical system and which changes nonlinearly in accordance with a distance to a subject included in the image.

13. The learning method of claim 1, wherein the statistical model is generated by learning bokeh which is generated in an image generated based on light transmitted through a filter and which changes nonlinearly in accordance with a distance to a subject included in the image.

14. A non-transitory computer-readable storage medium having stored thereon a computer program which is executable by a computer and causes a statistical model for inputting an image including a subject and outputting a distance to the subject to learn, the computer program comprising instructions capable of causing the computer to execute functions of:
acquiring first and second images each including the subject captured by a capture device; and
causing the statistical model to learn based on a first distance output from the statistical model by inputting a first region that is at least a part of the first image, and a second distance output from the statistical model by inputting a second region that is at least a part of the second image, wherein
a relationship in size between a third distance to the subject included in the first image and a fourth distance to the subject included in the second image is already known,
the causing includes causing the statistical model to learn such that a relationship in size between the first distance and the second distance is equal to a relationship in size between the third distance and the fourth distance.

15. An image processing device for causing a statistical model for inputting an image including a subject and outputting a distance to the subject to learn, the image processing device comprising:
a processor configured to:
acquire first and second images including the subject captured by a capture device; and
cause the statistical model to learn based on a first distance output from the statistical model by inputting a first region that is at least a part of the first image, and a second distance output from the statistical model by inputting a second region that is at least a part of the second image, wherein
a relationship in size between a third distance to the subject included in the first image and a fourth distance to the subject included in the second image is already known,
the causing includes causing the statistical model to learn such that a relationship in size between the first distance and the second distance is equal to a relationship in size between the third distance and the fourth distance.

* * * * *